Jan. 7, 1964     C. A. SECKERSON     3,116,646

PANEL MOUNTED OPERATING CABLE AND FASTENER ASSEMBLY

Filed July 17, 1961

Inventor
Clifford A. Seckerson
by Malcolm W. Fraser
attorney

3,116,646
PANEL MOUNTED OPERATING CABLE AND FASTENER ASSEMBLY

Clifford Alexander Seckerson, Iver Heath, England, assignor to United-Carr Fastener Corporation, Boston, Mass., a corporation of Delaware
Filed July 17, 1961, Ser. No. 124,454
Claims priority, application Great Britain July 19, 1960
6 Claims. (Cl. 74—501)

The present invention relates to an improved fastener which is particularly, although not exclusively suitable for securing a plastic rod or armoured cable, such as a Bowden cable, to an apertured panel.

A preferred form of the invention will now be described with reference to the accompanying drawings, in which.

Figure 1:
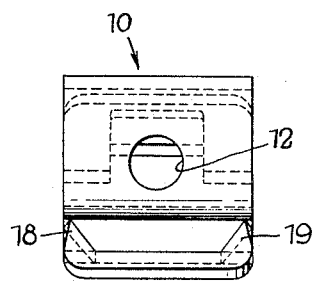
FIGURES 1 and 2 are respectively a front elevation plan view of a fastener.
Figure 2:
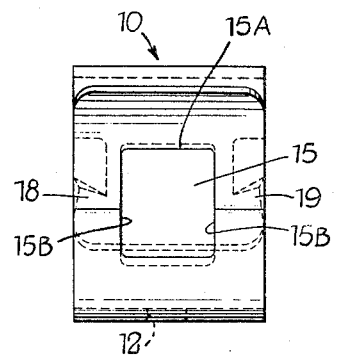

A fastener, indicated generally in the figures at 10, is formed from a single parallel-sided strip of steel which after being sheared and bent to the final shape shown in the figures may be rendered resilient and rustproof in any known or convenient manner.

The fastener 10 is formed by bending the strip so as to have an intermediate portion 11 formed with a hole 12 and two arms 13 and 14 extending therefrom.

The arm 13 is inwardly elbowed at 13A and a rectangular aperture 15 is formed across the elbow 13A, the opposed edges 15A of the aperture being directed transversely of the arm 13.

The arm 14 is formed with member-engaging means, comprising an extension 16, 17, which forms with the arm 14 a U-shaped loop. Two prongs 18 and 19 are formed in the extension and directed inwardly and rearwardly with respect to the U-shaped loop.

Figure 3:
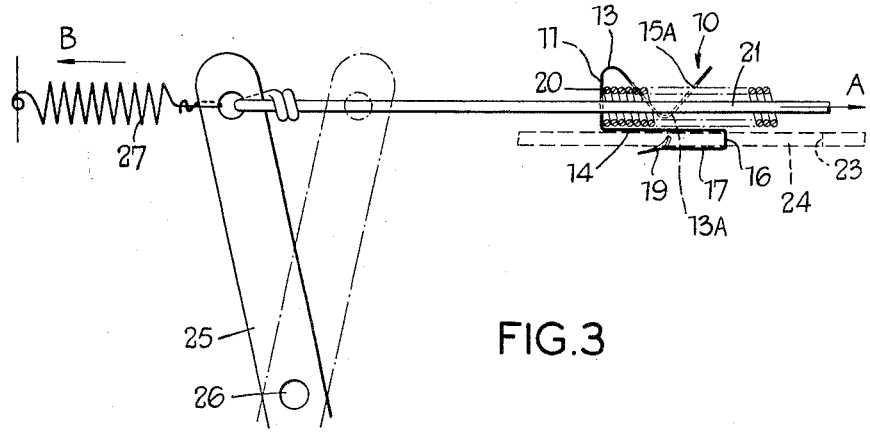
FIGURE 3 is a side elevation showing the fastener securing a Bowden cable to an apertured panel and the Bowden cable attached to a spring loaded lever.
Figure 4:
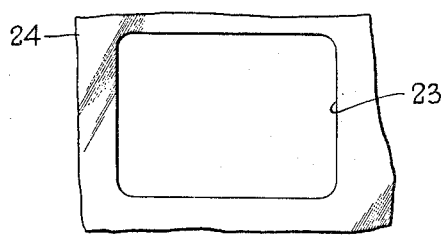
FIGURE 4 shows the aperture in the panel shown in FIGURE 3.

The fastener 10 is used, as shown in FIGURE 3, to secure a Bowden cable comprising a sheath 20 and an inner cable 21, to a panel 24 formed with an aperture 23. The aperture 23 is shown in FIGURE 4 as rectangular but the fastener may be used in an aperture of any shape or if desired on a panel edge.

To make the assembly shown in FIGURE 3 the fastener 10 is engaged on the panel 24 by passing the extension 16, 17 through the aperture 23 so that the prongs 18 and 19 bite into the underside of the panel retaining the fastener in position. The Bowden cable is then pushed or screwed through the aperture 15 in the fastener the dimensions of the fastener and Bowden cable being such that the latter is resiliently pinched between the two arms 13 and 14 of the fastener.

The sheath 20 of the Bowden cable is in the form of a helical spring and it can thus be screwed through the aperture 15, the outer edge 15A of the aperture which runs transversely of the arm 13 biting into the grooves in the sheath and the opposed edges 15B which run longitudinally of the arm 13 serving to locate the sheath and prevent sideways movement of the Bowden cable.

It will be seen from FIGURE 1 that, taken transversely of the strip, the dimensions of the hole 12 are less than the dimensions of the aperture 15 and thus the sheath 20 of the Bowden cable can be inserted between the longitudinal edges 15B of the aperture 15 until it abuts against the intermediate portion 11, and the inner cable then passes through the hole 12, as shown in FIGURE 3.

The inner cable 21 is connected to a lever 25 pivoted at 26 and urged away from the fastener 10 by a spring 27. The lever may be used to control any mechanism such as a carburettor opening and is merely illustrative of the purposes for which the Bowden cable may be used.

It will be seen that when the inner cable 21 is drawn in the direction of the arrow A a force is exerted in the opposite direction B on the sheath 20 which urges the fastener 10 more firmly onto the panel 24.

In the following claims the expression "cable" is used to include a rod either flexible or rigid.

What I claim is:

1. An assembly of a cable secured to an apertured panel by means of a fastener in the form of a single strip of resilient material having an intermediate portion formed with a hole and two arms extending therefrom, one arm being formed with member-engaging means and the other arm being inwardly elbowed and formed with an aperture in the elbow, wherein the one arm is engaged in the aperture in the panel and the cable passes through the hole in the intermediate portion of the fastener, is lodged within the aperture in the other arm and is resiliently pinched between the two arms of the fastener.

2. An assembly as claimed in claim 1, wherein the cable is transversely grooved on its outer surface and the aperture in the other arm of the fastener is substantially rectangular with its pairs of opposed edges directed respectively transversely and longitudinally of the other arm, the cable lying between the longitudinal edges of the aperture in the other arm and being resiliently pinched between a transverse edge of the said aperture and the one arm, a transverse edge of the said aperture engaging in the grooves in the cable.

3. An assembly as claimed in claim 1, wherein the cable is transversely grooved on its outer surface and the dimension, transversely of the strip, of the hole in the intermediate portion is less than the dimension, transversely of the strip, of the aperture in the other arm, the cable lying between the edges of the aperture in the other arm and being resiliently pinched between a transverse edge of the said aperture and the one arm, a transverse edge of the said aperture engaging in the grooves in the cable.

4. An assembly as claimed in claim 1, wherein the cable is a Bowden cable having an inner cable and a sheath and the dimension, transversely of the strip, of the hole in the intermediate portion of the said fastener is less than the dimension, transversely of the strip, of the aperture in the other arm, wherein the inner cable passes through the hole in the intermediate portion of the fastener, the sheath being resiliently pinched between the two arms and butting against the intermediate portion.

5. A fastener for attaching a rod substantially parallel to the surface of a panel, comprising a single strip of resilient material of R-shape providing an intermediate portion and two arms extending therefrom, an inwardly directed elbow on one arm having a rod engaging aperture and adapted to hold the rod parallel to the panel, the intermediate portion having a hole through which the rod may extend, and means on the other arm enabling it to be attached to a panel edge.

6. A fastener as claimed in claim 5 in which the rod engaging aperture in the one arm is substantially rectangular having its pairs of opposed edges directed respectively transversely and longitudinally of the one arm whereby the transverse edges are adapted to hold the rod against the other arm and the longitudinal edges are adapted to hold the rod in alignment with the said hole in the said intermediate portion.

References Cited in the file of this patent

UNITED STATES PATENTS

| | | |
|---|---|---|
| 1,454,636 | Goldberg | May 8, 1923 |
| 1,667,688 | Goetzelman | Apr. 24, 1928 |
| 1,745,326 | Jacobi | Jan. 28, 1930 |
| 1,783,409 | Cook | Dec. 2, 1930 |
| 1,996,249 | McCann | Apr. 2, 1935 |
| 2,276,818 | Bellows | Mar. 17, 1942 |
| 2,332,855 | Jones | Oct. 26, 1943 |
| 2,657,443 | Hartman | Nov. 3, 1953 |
| 2,685,720 | Petri | Aug. 10, 1954 |
| 2,691,293 | Patterson | Oct. 12, 1954 |
| 2,833,419 | Trumpy | May 6, 1958 |
| 2,860,788 | Hardman | Nov. 18, 1958 |
| 2,864,378 | Schneller et al. | Dec. 16, 1958 |
| 3,037,729 | Holton | June 5, 1962 |

FOREIGN PATENTS

| | | |
|---|---|---|
| 521,128 | Canada | Jan. 24, 1956 |